Dec. 7, 1965 W. J. HALL 3,221,598
DETACHABLE CONTROL MEANS FOR SLIDE PROJECTORS OR THE LIKE
Filed Dec. 31, 1962 3 Sheets-Sheet 1
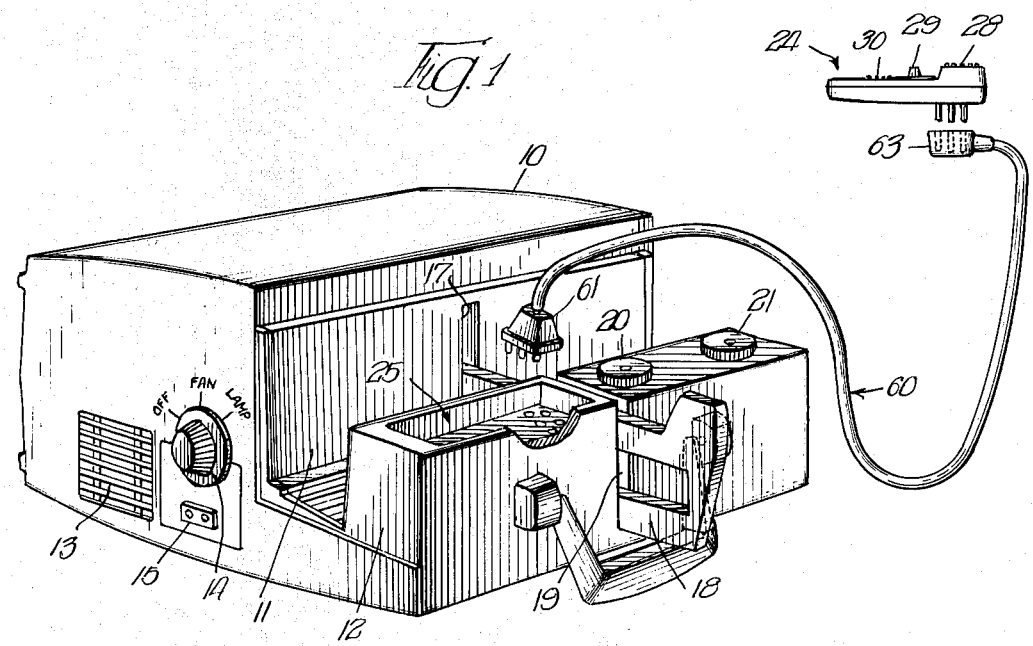
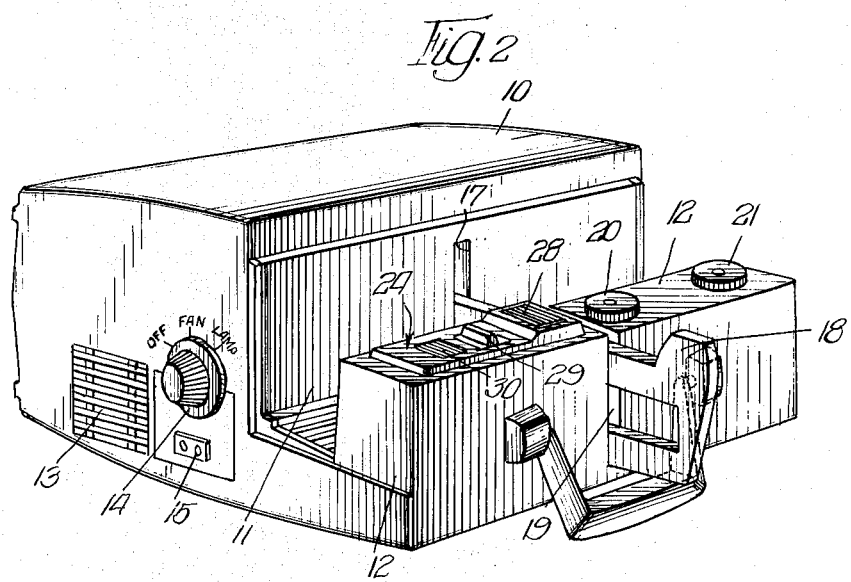
INVENTOR.
Walter J. Hall,
BY
Cromwell, Greist + Warden
Attys

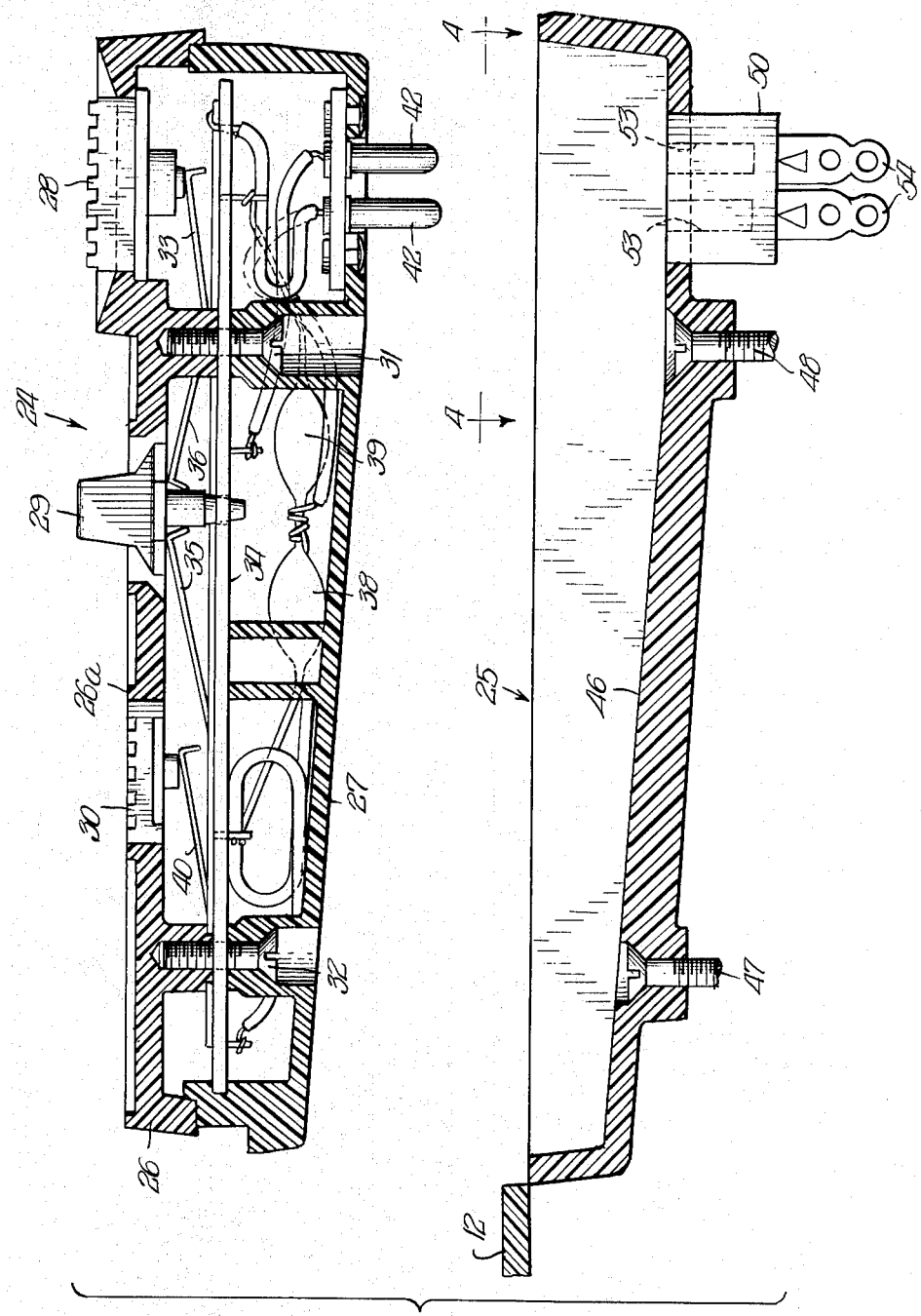

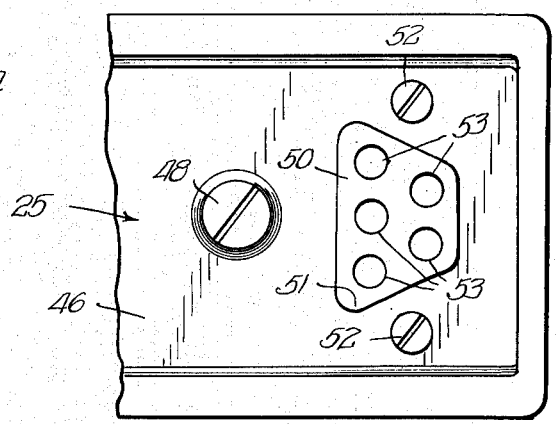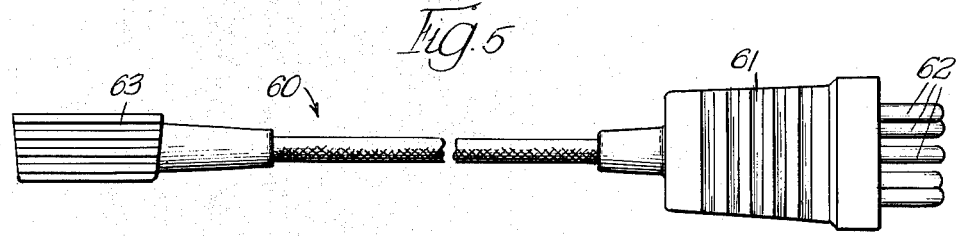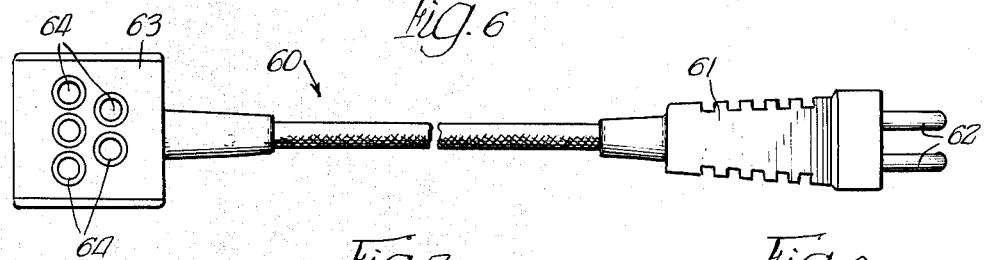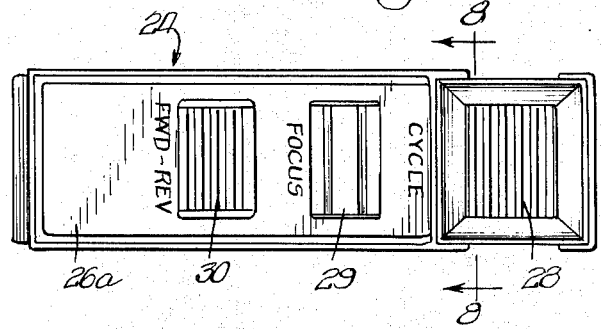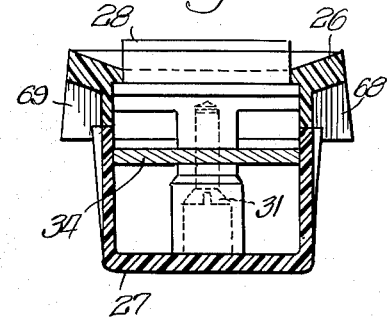

United States Patent Office 3,221,598
Patented Dec. 7, 1965

3,221,598
DETACHABLE CONTROL MEANS FOR SLIDE
PROJECTORS OR THE LIKE
Walter J. Hall, Chicago, Ill., assignor to Sawyers Research
Development Corporation, Chicago, Ill., a corporation
of Delaware
Filed Dec. 31, 1962, Ser. No. 248,312
2 Claims. (Cl. 88—28)

This invention relates to control means for a slide projector or the like, and more particularly to control means which may be used either as an integral part of the projector, or as a detachable handpiece permitting remote control operation of the projector.

Known slide projectors have been provided with remote control means. Such projectors are provided with one set of control knobs permanently attached to the slide projector for operation of the same. These projectors include a remote-control handpiece having appropriate control buttons thereon, which handpiece is permanently attached to one end of a conductor cord for connecting the handpiece to the projector. In these projectors the handpiece is more in the nature of an attachment or accessory, as the projector may be completely operated without the handpiece. Audio and video equipment have also been provided with remote-control means. For example, it is known to provide a television set with a remote-control handpiece, which handpiece is capable of operating the television set without being connected to the same in any way. Again, these handpieces are in the nature of an accessory as they contain controls which are duplicates of controls mounted on the television housing. In known audio, video or projector equipment, the remote-control handpieces are separate accessories, and they are only used when the equipment is being operated remotely.

It is a primary object of this invention to provide operator control means forming an integral part of the housing of a slide projector or the like, which control means includes a remote-control handpiece adapted to be detached from the housing for remote-control operation of the projector.

It is a more specific object of this invention to provide a remote-control handpiece for a slide projector or the like, which handpiece is adapted to be directly mounted to the slide projector for operation of the same as an integral part of the control panel of the projector, and which handpiece is adapted to be detached from the projector for remote-control operation of the same.

An important object of the invention is to provide a slide projector or the like with a manual control device which optionally can be attached to the projector so as to appear as a permanent part of the control panel, or which can be removed or detached and used as a remote-control handpiece on the end of a conductor cord.

It is a further object of this invention to provide operator control means for a slide projector or the like, which control means includes a remote-control handpiece adapted to be detachably received in a complementary shaped cavity in the housing of the projector for operation of the same as an integral part of the control panel of the projector, which handpiece is adapted to be detached from the cavity for remote operation of the projector.

It is an even further object of this invention to provide operator control means for a slide projector or the like, which control means includes a remote-control handpiece having first contact means thereon, the handpiece being adapted to be received in a complementary shaped cavity in the control panel of the projector with the first contact means in mating engagement with second contact means in the cavity, and which handpiece is adapted to be detached from the cavity for remote operation of the projector by engagement of the first contact means with one end of elongated flexible conductor means, the second contact means being adapted for engagement with the other end of the conductor means.

It is a still further object of the invention to provide operator control means of the type described for a slide projector or the like, which control means permits a slide projector to be manufactured at less cost than conventional projectors having the same capabilities.

These and other objects and advantages of the invention will become apparent from the following specification wherein like numerals refer to similar parts throughout.

In the drawings:

FIG. 1 is a perspective view of a slide projector embodying one form of the control means of this invention, the control means being shown in detached condition for remote operation of the projector;

FIG. 2 is a perspective view of the slide projector of FIG. 1 showing the remote-control handpiece mounted on the projector and forming an integral part of the control panel of the same;

FIG. 3 is an exploded fragmentary vertical section taken through the slide projector of FIG. 2 along a longitudinal axis of the remote-control handpiece;

FIG. 4 is a fragmentary top plan view taken on line 4—4 of FIG. 3 of the handpiece-receiving cavity formed in the control panel of the slide projector;

FIGS. 5 and 6 are views of an electric cord for placing the remote-control handpiece in electrical communication with the slide projector when the handpiece is detached from its complementary shaped cavity in the control panel of the projector;

FIG. 7 is a top plan view of the remote-control handpiece; and

FIG. 8 is a section taken along the line 8—8 of FIG. 7.

Referring to FIGS. 1 and 2, a slide projector embodying one form of the operator control means of this invention will be seen to include a housing 10 having a slide-tray-receiving groove 11 along one side thereof, which groove defines a control panel portion 12 at one side of the housing. The slide projector may include a cover (not shown) for enclosing the groove 11 and panel 12 when the projector is not being used. The slide projector, which may be of the general type shown in the Golden application Serial No. 111,783, filed May 22, 1961, contains conventional projection means (not shown) including a lamp bulb, reflectors, and lenses mounted in an adjustable focusing lens housing. A blower associated with an air duct 13 is provided for inducing a flow of air past the bulb for substantially reducing the temperature within the housing 10. The casing also includes an off-fan-lamp switch 14 and an electrical socket 15 adapted to receive a conventional 2-prong plug on one end of an electric cord for supplying electric power to the slide projector. It will be understood that the groove 11 is adapted to receive a slide tray of the elongated box-like or cylindrical type, which tray is designed to support a plurality of 2 x 2 mounted photographic slides. A vertically extending slide aperture 17 in one wall of the main housing defining the groove 11 permits transfer of slides from a slide tray to projection position on the interior of the projector for viewing of the slides. A reciprocating slide carrier 18 mounted in a transversely disposed slot 19 in the control panel portion 12 has one end thereof extending into the aperture 17 for movement of slides between a slide tray and the projector and vice versa.

The slide changing and projecting mechanisms, which may be manually or automatically operated as described in the above referred to Golden application, do not form a part of this invention. The control means of this invention may be incorporated in the design of other types of slide projectors, as well as audio or video equipment, for operation of the same.

The control panel portion 12 supports a knob 20 near the mid point thereof, which knob is connected with timing means in the casing for varying the time each slide is projected, whereby slides may be automatically shown or projected for intervals of five, ten, or thirty seconds, for example. A knob 21 is also provided on the face of the control panel to permit manual focusing of the slide projector. The control means adapted for operation of the slide projector 10 will now be described.

Briefly and by way of introduction, the operator control means includes a remote-control handpiece adapted to be detachably secured to the casing of the slide projector in adjoining relationship therewith for forming an integral part of the housing of the slide projector. The handpiece contains appropriate hand operated control buttons for controlling the various operating components of the slide projector. Electric contact means are provided on the handpiece, which contact means are adapted for mating engagement with contact means on the projector when the handpiece is secured to the projector in adjoining relationship therewith. Accordingly, manipulation of the controls on the handpiece when the same is secured to the projector in the manner described permits complete operation of the components of the slide projector, thereby obviating the need for permanently mounted hand controls on the slide projector. The handpiece is adapted to be detached from the slide projector for remote operation of the same. This is accomplished by removing the handpiece from its complementary shaped pocket or cavity in the control panel of the housing and engaging the contact means on the handpiece with one end of an electric conductor, such as an electric cord. The contact means on the projector which were in engagement with the contact means on the handpiece are adapted to be engaged by the other end of the electric cord for placing the handpiece in electrical communication with the slide projector when the handpiece is detached from the projector, thereby permitting remote operation of the slide projector by manipulation of the controls on the handpiece.

In the embodiment of the invention shown for purposes of illustration, the control means will be seen to include a remote-control handpiece, generally designated 24, which handpiece is adapted to be received in a complementary shaped cavity or pocket, generally designated 25, formed in the upper surface of the control panel portion 12 of the casing 10. The handpiece 24 may be of the type shown in the above referred to Golden application. The handpiece is generally elongated and adapted to be easily grasped by the hand, and it includes mating upper and lower shell pieces 26 and 27, respectively, which shells may be molded from suitable plastic material. The upper shell 26 includes a face 26a provided with suitable openings for receiving a cycle button 28, a focus button 29 and a forward-reverse button 30. The shell members, which are adapted to be held together by a pair of screws 31 and 32, define a plurality of cavities for receiving appropriate wiring and contact terminals associated with the control buttons on the handpiece. The button 28 is engageable with one end of a contact strip 33, the other end of which strip is mounted to a contact plate 34. The focus button 29 is a two-way button engageable with confronting ends of a pair of contact strips 35 and 36. The other ends of the strips 35 and 36 are attached to the contact plate 34 and to a pair of diodes 38 and 39, one of which diodes has its polarity reversed relative to the other diode adapting the button 29 for operation of a reversible focus motor within the projector casing. The forward-reverse button 30 is engageable with one end of a contact strip 40, the other end of which strip is secured to the contact plate 34. The various contact strips are suitably wired for electrical communication with a plurality of contact pins which depend from the underside of the handpiece 24 at one end thereof. In the embodiment shown for purposes of illustration, five pins 42 are provided on the handpiece 24, one of which pins is not used. This extra pin adapts the handpiece for incorporation of means for remote control of additional operating components of the projector. The remaining four pins constitute the cycle, focus, forward-reverse, and common leads.

It will be realized that when the handpiece 24 is in electrical communication with the slide projector by means of the contact pins 42, depressing of the cylinder button 28 results in the operation of the slide transfer cycle of the slide projector, i.e., transverse reciprocatory movement of the slide carrier 18 and indexing of the slide tray. Manipulation of the focus button 29 results in operation of the lens adjustment housing for focusing a slide being projected, and manipulation of the forward-reverse button 30 allows an operator to change the direction in which the slide tray is to be indexed.

The cavity or pocket 25 is formed by a half-shell member 46, which shell 46 is secured in the control panel of the casing by a pair of screws 47 and 48. It will be understood that the half-shell 46 is shaped for snugly receiving the shell 27 of the handpiece 24, so that when the handpiece is in place in the pocket 25 only the upper portion of the handpiece shell 26 projects above the top surface of the control panel portion 12 of the slide projector casing. As best seen in FIGS. 3 and 4, a socket member 50 is secured in an aperture 51 formed in the base of the shell 46 and held in place by a pair of screws 52. The socket member 50 is provided with a plurality of sockets 53 corresponding to the number and arrangement of pins 42 on the handpiece 24, which sockets 53 are adapted to receive the pins 42 when the handpiece is received in the pocket 25. The sockets 53 are connected with lugs 54, which lugs are in electrical communication with the various components within the slide projector. It will be realized that when the handpiece 24 is received in the pocket 25 with the pins 42 in mating engagement with the sockets 53, manipulation of the various control buttons on the handpiece will result in operation of the operating components in the slide projector corresponding to the control button being manipulated. As best seen in FIG. 2, when the remote-control handpiece 24 is in place in the pocket 25, the handpiece forms an integral part of the housing with the face 26a thereof blending in with the over-all configuration of the control panel, i.e., the handpiece does not appear as a separate detachable member but rather, as a permanent portion of the control panel.

However, the handpiece 24 may be quickly and easily detached from the pocket 25 of the slide projector for remote operation of the components thereof. This is accomplished by placing the remote control handpiece 24 in electrical communication with the slide projector by means of an electric cord generally designated 60. The cord is of the multi-conductor type having a head member 61 at one end thereof, which head has a plurality of prongs 62 projecting therefrom. A socket head 63 is provided at the other end of the cord 60, which socket head includes a plurality of individual sockets 64. It will be understood that the number and arrangement of the sockets 64 correspond with the number and arrangement of the pins 42 on the handpiece 24. Likewise, the number and arrangement of the prongs 62 on the head member 61 correspond with the number and arrangement of the sockets 53 of the socket member 50. The handpiece 24 is placed in electrical communication with the slide projector for remote operation of the same by engagement of the pins 42 in the sockets 64 and by engagement of the prongs 62 with the sockets 53. It will be realized that the conductors in the cord 60 are so arranged that when the handpiece is in electrical communication with the slide projector by means of the cord 60 manipulation of the various buttons on the handpiece will result in operation of the component of the slide projector corresponding with the particular button manipulated.

As seen in FIGS. 7 and 8, the end of the handpiece containing the cycle button 28 is provided with a pair of oppositely disposed finger receiving recesses 68 and 69. The recesses 68 and 69 permit the handpiece to be easily grasped by the hand of a person for detaching the same from the pocket 25 in the slide projector.

Thus it will be seen that by this invention new and improved control means have been provided for a slide projector or the like. The control means includes a remote-control handpiece and a complementary shaped cavity in the control panel portion of the housing of the projector, which cavity is adapted to receive the handpiece therein. Contact means on the handpiece and in the cavity are provided permitting operation of the various operating components of the slide projector by the handpiece when the handpiece is received in the cavity. When the handpiece is in place in the cavity, it appears to form an integral part of the slide projector housing. The handpiece includes a face adapted to blend in with the over-all configuration of the slide projector control panel. In this way, when the handpiece is in place in the cavity, it does not appear as a separate detachable member. Remote operation of the projector may be quickly and easily accomplished by removing or detaching the handpiece 24 from the cavity 25 and connecting the conductor 60 between the contact pins 42 on the handpiece and the sockets 53 in the housing cavity. Thus, the handpiece, which is adapted to appear as an integral part of the slide projector housing when received in the cavity therein, permits remote operation of the components of the slide projector when in electrical communication with the same by means of the cord 60. By this unique construction of the handpiece 24 and complementary shaped pocket 25, a single set of control buttons permit remote operation of the slide projector as well as operation of the same directly from the housing thereof. This construction permits a slide projector having remote-control operation means to be manufactured at less cost than conventional projectors of similar type which are provided with duplicate sets of control buttons, one of which set is permanently mounted on the housing of the projector.

While the invention has been shown in but one form, it will be obvious to those skilled in the art that it is not to be so limited, but on the contrary, it is susceptible of various changes and modifications without departing from the spirit and scope of the appended claims. For example, the operator control means of this invention will find utility in the operation of television sets as well as audio equipment, such as radios and hi-fi equipment.

I claim:

1. Control means for a slide projector having a housing and a control panel comprising said control panel having a cavity with first electric contact means therein, a remote-control handpiece adapted to be received in said cavity and having second electric contact means thereon complementary with said first contact means, which handpiece has a face adapted to blend in with the over-all configuration of the control panel, said handpiece being detachably secured to said projector by mating engagement of said first electric contact means with second electric contact means for operation of the projector, the mating engagement of said first and second contact means serving as the sole means for detachably securing said hand piece to said projector, said handpiece being adapted to be detached from said projector for engagement of the second electric contact means with complementary contact means on one end of elongated, flexible, electric, conductor means, said first electric contact means being adapted for engagement with other complementary contact means on the other end of said electric conductor means, whereby said projector may be operated remotely by said handpiece.

2. In a projector including a housing having a control panel portion, the combination comprising said control panel portion having first electric contact means forming a part thereof and exposed to the exterior of the housing, an electric conductor cord having electric contact means at one end thereof complementary with said first contact means and detachably engaged with the same thereby connecting said one end of the cord with the projector, a remote-control handpiece having second contact means forming a part thereof, other electric contact means on the other end of said cord and being complementary with said second contact means and detachably engaged with the same thereby connecting the handpiece to the projector for remote operation thereof, said second contact means also being complementary with said first contact means whereby upon disconnecting the cord from both the projector and the handpiece the latter may be directly connected to the former by engagement of said first and second contact means, the engagement of said first and second contact means serving as the sole means for securing the hand piece to the projector, said hand piece being configured for blending in with the configuration of the control panel portion when secured to the projector.

References Cited by the Examiner

UNITED STATES PATENTS

| 2,013,331 | 9/1935 | Alden | 334—8 X |
| 2,199,371 | 4/1940 | Goldsmith | 334—8 X |
| 2,333,028 | 10/1943 | Merrill. | |
| 2,748,653 | 6/1956 | Pollan et al. | |

FOREIGN PATENTS 1,108,466  6/1961  Germany.

NORTON ANSHER, *Primary Examiner.*

WILLIAM MISIEK, *Examiner.*